United States Patent [19]

Popke

[11] Patent Number: 5,341,414

[45] Date of Patent: Aug. 23, 1994

[54] CALLING NUMBER VERIFICATION SERVICE

[76] Inventor: Fred Popke, P.O. Box 18911, Irvine, Calif. 92713

[21] Appl. No.: 831,680

[22] Filed: Feb. 5, 1992

[51] Int. Cl.[5] .................... H04M 1/56; H04M 15/06; H04M 3/42; H04M 1/64
[52] U.S. Cl. ................... 379/142; 379/201; 379/69
[58] Field of Search ............... 379/142, 218, 201, 457, 379/127, 67, 68, 69, 245, 88, 210, 211

[56] References Cited

U.S. PATENT DOCUMENTS

| | | | |
|---|---|---|---|
| 4,672,660 | 6/1987 | Curtin | 379/245 X |
| 4,756,020 | 7/1988 | Fodale | 379/127 X |
| 4,894,861 | 1/1990 | Fujioka | 379/142 |
| 4,914,689 | 4/1990 | Grabinger et al. | 379/142 |
| 4,924,496 | 5/1990 | Figa et al. | 379/142 |
| 4,926,471 | 5/1990 | Ikeda | 379/142 X |
| 4,996,704 | 2/1991 | Bruson | 379/245 X |
| 5,033,076 | 7/1991 | Jonos et al. | 379/88 X |
| 5,046,088 | 9/1991 | Margulies | 379/211 |
| 5,048,075 | 9/1991 | Katz | 379/92 |
| 5,056,086 | 10/1991 | Libonai | 379/88 |
| 5,056,134 | 10/1991 | Bauer et al. | 379/246 |
| 5,058,152 | 10/1991 | Solomon et al. | 379/67 |
| 5,070,525 | 12/1991 | Szlam et al. | 379/196 |
| 5,077,788 | 12/1991 | Cook et al. | 379/142 |
| 5,113,430 | 5/1992 | Richardson, Jr. et al. | 379/88 |
| 5,161,181 | 11/1992 | Zwick | 379/142 X |

OTHER PUBLICATIONS

Excerpts taken from FCC 91-300 38241 CC Docket 91-281.

*Primary Examiner*—Stephen Chin
*Assistant Examiner*—Paul Loomis

[57] ABSTRACT

A system which uses Automatic Number Identification (ANI) equipment and techniques and/or Caller ID equipment and techniques to provide a means for telecommunicators to verify if identifying information such as their telephone number or the location they are calling from is being passed to receiving parties and/or if their call blocking or rerouting methods to prevent this from happening are effective.

4 Claims, 3 Drawing Sheets

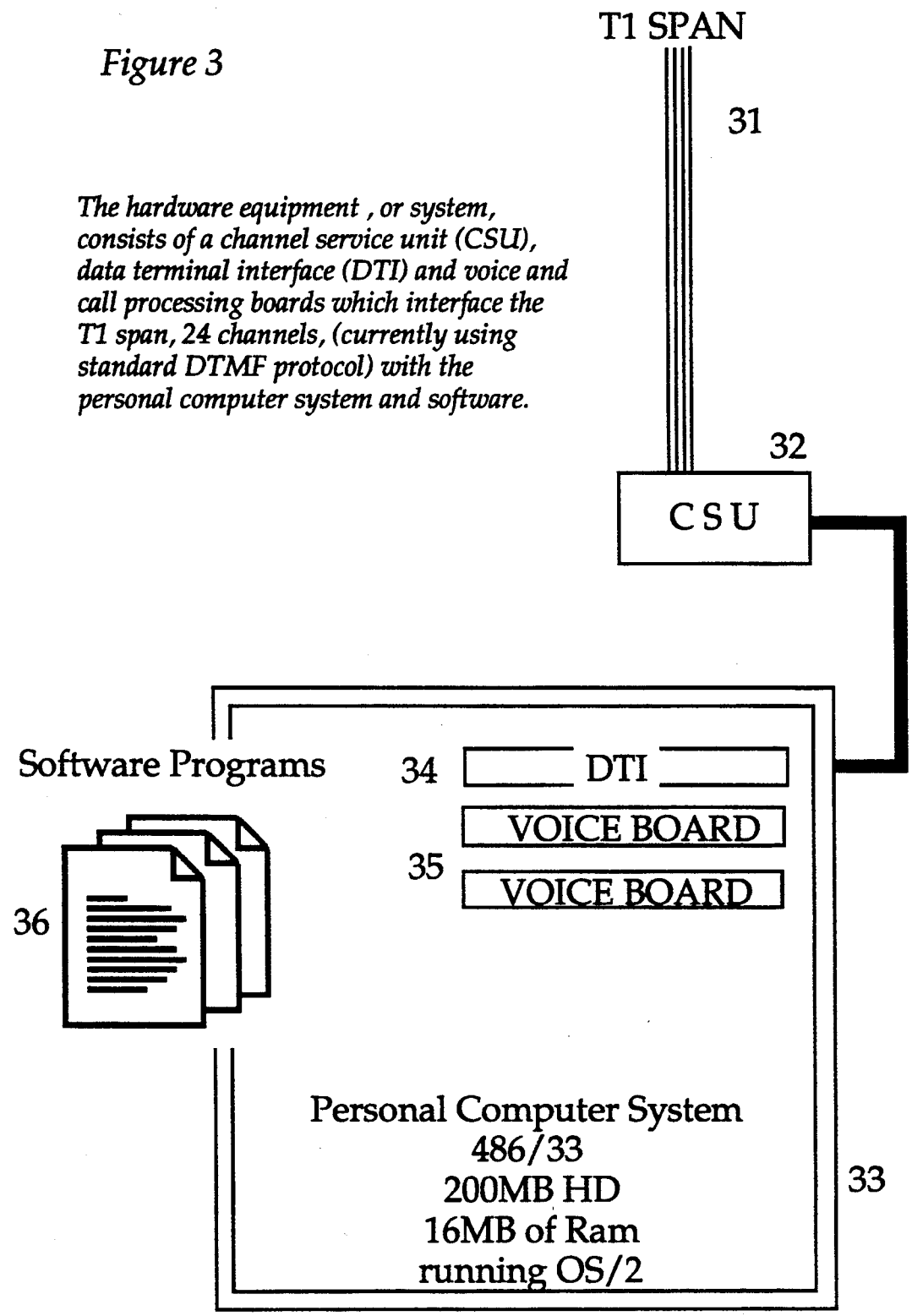

CALLING NUMBER VERIFICATION SERVICE

BACKGROUND

1. Field of the Invention

The field of this invention involves applications of automatic telephone number identification (ANI) techniques and telephone caller identification (Caller ID) techniques and. More specifically, the present invention provides a means for callers to verify if their phone number, or billing number, is being passed to the receiving party and/or if their blocking or rerouting methods to prevent this from happening are effective.

The following background information from another publication is presented in order to clarify some of the concepts, terminologies and issues as they relate to this invention.

Excerpts taken, from FCC 91-300 38241 CC Docket 91-281
Released Oct. 23, 1991
Notice of Proposed Rulemaking
Rules and policies regarding calling number identification service.

2. Caller ID service, calling number delivery service, calling line identification, directory number, and calling party identification are terms used interchangeably to refer to a relatively new telephone service offering which identifies the calling number to the called party. The service is most frequently referred to as caller ID service. Caller ID, currently offered on an intrastate basis, allows subscribers, when they receive local telephone calls, to have the local exchange carrier (LEC) transmit to them the telephone number of the station originating the call. The subscribers must purchase a "number identification device" which is connected to a network jack and then to the subscriber's telephone. Some telephones incorporate the number identification device into the telephone unit itself. The device displays the calling party's telephone number between the first and second ring via common channel signaling technology. Number identification devices and number identification capable telephones are customer premises equipment which manufacturers must register under Part 68 of the Commission's rules. Approximately sixteen types of such devices have been registered with the Commission. These devices currently retail for between sixty and one hundred dollars. Some models include a memory function, which can display, for example, the last fifteen telephone numbers to call the subscriber's number.

3. In addition to purchasing the number identification instrument, the customer must subscribe to Caller ID service from the LEC. The service is currently tariffed at the state level in a growing number of states at a cost ranging from approximately six to ten dollars per month. Transmission of Caller ID is made possible by the out-of-band signalling capabilities of SS7 technology being deployed by the telecommunications industry worldwide. Under current deployment schedules of the LECS, in just a few years most residential users will be served by SS7 equipped local offices. Caller ID is not yet available on an interstate basis to residential subscribers. However, a form of the service is currently available in conjunction with interexchanie carries' (IXCs') 800 a 900 service offerings which allows businesses to identify incoming customer calls. This form of the service is based upon Automatic Number Identification (ANI) technology and functions quite differently from residential Caller ID services.

4. Interstate Caller ID. The availability of interstate Caller ID service requires interconnection of the local exchange carriers' SS7 networks with interexchange carrier SS7 networks, so that the calling party's number can be transmitted from the originating end to the terminating end of the call. Effective nationwide Caller ID will not be feasible, therefore, until SS7 interconnection has become fairly ubiquitous. This interconnection process is underway, technical issues are being addressed, and some of the Bell Operating Companies (BOC's) have filed SS7 interconnection tariffs at the Commission. At least some of the BOC tariffs propose to transmit the calling party's number to IXCs as part of the SS7 signalling data. Once SS7 interconnections are in place, interstate Caller ID service will require agreement among the IXCs and the LECs regarding the transmission of Caller ID data from one carrier to another. Specifically, while the LECs may pass the calling party's number to IXCs pursuant to SS7 interconnection tariffs, the IXCs are currently under no obligation to pass that data to the terminating LEC or end user.

5. Interstate Automatic Number Identification (ANI). ANI is a service similar to but distinct from Caller ID. ANI is the billing telephone number of the calling party. It is transmitted primarily on toll/access calls on the trunk side connection to the LEC's switch. ANI has traditionally been used by LECs and IXCs to identify telephone numbers for billing purposes. ANI was designed to provided IXCs the number to bill for transmission of an interstate call. Under current technology, and due to the very nature of its original intended purposed, ANI is not blockable in the same way as Caller ID. ANI can be transmitted in-band (down the same wire path as the call) or it can be transmitted out-of-band (travels on a physically distinct path from the call) with SS7 trunking. The in-band signal is multi-frequency machine readable. The ANI information is transmitted before the dialed number. Because it precedes the call it can be used not only for billing purposes but also for routing calls to correct stations within an organization. ANI is available to IXCs and other subscribers from LECs through Feature Group D access service and Feature Group B over D access service. ANI is also available through IXCs in conjunction with 800 or 900 service. Businesses subscribing to interstate ANI service are utilizing ANI for such applications as: dealer location, to associate an incoming call with the dealer closest to the caller's location; alarm signalling, to associate an incoming call with the caller's address; data security, as a secondary means to restrict access to electronic information to calls emanating from particular numbers only; call redirection/routing capability, to transfer calls to employees handling particular geographic locations, ANI information can also be combined by the subscriber with a database of information associated with an incoming calling number. This application is used in customer service or order taking applications to match an incoming call instantly with billing information about that customer, such as account balance or prior purchases or transactions. Delivery of ANI today requires a dedicated line between the IXC and the business subscriber. This is because the ANI is transmitted directly to the subscriber of 800 or 900 service, bypassing the terminating local exchange carrier. Thus, although ANI appears on the surface to be a type of interstate Caller ID service, it differs from Caller ID in that it precedes the call by arriving at the called station before the first ring or simultaneous with the first ring, provides the billing rather than calling location number, is provided directly by the IXC only on calls that do not use a terminating LEC, and identification of ANI is not blockable by the calling party under current technology.

8. As discussed at para. 3, supra, the technology to make possible a nationwide Caller ID service is already being put in place. Interstate Caller ID would enhance the value of the service to intrastate subscribers and augment the available choices of existing interstate services to all subscribers. The ability to choose Caller ID and other services based on access to Caller ID information should be available to interstate subscribers nationally. The evidence before us indicates that several regulatory and legal issues may delay the introduction of interstate Caller ID. The Commission proposes to address these issues in the context of this NPRM to establish a national model for delivery of interstate Caller ID service.

12. Transmission of Callin Party Number. The transmission of the calling party number by the LEC to the IXC is an essential element of interstate Caller ID. The Commission tentatively concludes that LECs should be required to provide the calling party's number to IXCs as soon as technologically feasible. Delivery of the calling party's number to any terminating LEC is an equally essential element to interstate Caller ID. Therefore, the Commission proposes that IXCs should be required to transmit the calling party number to the terminating LEC as soon as technologically feasible. Such requirements are in the public interest in that they assure the physical transmission of the calling party number on all interstate calls in a uniform manner. The Commission notes that several carriers have already filed SS7 interstate access tariffs which include calling party number delivery as a component of access service.

14. Privacy. Caller ID services involve at least two competing privacy interests. First, the called party may desire to know who is calling before answering. Second, the caller may have a desire not to reveal the calling number. Thus, Caller ID services may, at times, put the called party's desire to identify the caller in conflict with the caller's desire for anonymity. We tentatively conclude that the called party, especially in the residential setting, values highly privacy in determining whether or not to allow the caller to telephonically enter the premises. This has long been recognized in conjunction with obscene, prank or harassment calls and seems increasingly reflected in consumers' desires to have the opportunity to screen out unwanted and intrusive commercial calls. We also tentatively conclude that the caller may also have a need not to disclose the calling number under certain circumstances. Thus, it is necessary to balance the privacy interest of the called party against the privacy interest of the caller in formulating any federal policy or rule. Although the states have struck the balance in varying ways, and in some states callers have no privacy protection mechanisms, the Commission tentatively proposes that interstate Caller ID service should provide some type of privacy protection mechanism. We believe that such a balancing of the privacy interest in question adequately protects the needs of the called party, ensures the viability of the service overall, and establishes a mechanism for the protection of the calling public with legitimate privacy needs such as health and safety concerns.

20. Technical Measures to Protect Privacy. Having tentatively concluded that, as a matter Of policy, non-disclosure of the calling number is in the public interest under some circumstances, we now turn to an analysis of the methods available to bar disclosure of the calling number. The two methods most often deployed in intrastate Caller ID service are per call and per line blocking. The per line blocking option bars disclosure of the calling number automatically for all calls emanating from a particular subscriber line. We tentatively conclude that the per line automatic blocking option unduly burdens the effectiveness of the service overall by failing to limit its applicability to those calling circumstances where privacy is important to the calling party. For example, in the case of law enforcement personnel, there may be a need to maintain calling number privacy on some calls, but that same line may be used to telephone other law enforcement personnel, victims of crime, cooperative witnesses, and/or family or friends. In these types of calls, calling number privacy is not needed and calling number identification can actually be a valuable piece of information for both the caller and called party. Per line blocking would undercut the usefulness of Caller ID. To a lesser degree, per call blocking will dilute the usefulness of Caller ID. For example, the per call blocking option could allow the obscene or harassing caller to continue criminal activity with impunity. In addition, the greater the number of calls placed using per call blocking, the less effective and valuable Caller ID service is overall. On the other hand, a per call blocking option should recognize the calling party's privacy concerns. The Commission seeks comment analyzing the relative merits, technical feasibility and foreseeable costs to carriers and customers of establishing a requirement that interstate Caller ID services incorporate a per call blocking option. The Commission seeks comment on whether the per call blocking option should be operator assisted or automatic and on whether it is appropriate to charge the calling party for blocking.

23. Subscriber Education. The Commission notes that regardless of the scope of the privacy interest in question and regulatory mechanism to address the issue, the public interest requires that subscribers be made aware when caller identification services become available on an interstate basis and called parties are able to identify their calling number. No segment of the calling public can adequately control dissemination of the calling number under any regulatory structure if they are unaware that their calling number is being identified. Carriers offering interstate Caller ID service, or facilitating transmission of interstate Caller ID, should be required to inform callers of the availability of the service, including instructions to callers regarding how to implement any caller privacy mechanisms. We ask what, if any, other consumer education measures should be imposed. We seek comment on whether this education requirement should fall upon local exchange carriers or interexchange carriers or both. We seek specific proposals on how these education efforts can be best effectuated, and ask parties to include cost estimates with their proposals.

27. As discussed at para. 4 supra, subscribers to 800, 900 or local exchange access service sometimes also receive the ANI associated with a call. This is a distinct offering from Caller ID service in that it is not blockable in the same ways as Caller ID and, because there is a dedicated line between the IXC and the called party, it does not involve a terminating LEC in delivering the ANI to the called party; ANI also delivers the billing as opposed to the calling number and may be delivered to the called party simultaneously with the first rings. The petition proposes that availability of ANI (and features serving the same purpose in SS7 and ISDN) should be restricted to LECs and IXCs, for the purposes of call set-up, call management, billing and maintenance. The petition suggests that all parties other than carriers who wish to identify the calling party can be offered Caller ID, under tariff where tariff regulation obtains, for any applications which entail delivery of the calling party's identity to the called party. The petition states that the calling party's number should be delivered in the same manner as ANI was previously. It adds that this will ensure continued compliance by the LECs and the IXCs with the FCC's requirements for Open Network Architecture, and minimize any network modifications with might become necessary.

29. ANI is becoming increasingly available to non-carrier subscribers to interstate services via SS7 access tariffs. Although the service is technologically distinct from Caller ID services, the impact upon the calling party is the same—identification of a number associated with the calling party. The Commission tentatively concludes that it is not feasible to implement blocking of ANI at the will of the calling party. ANI is indispensable to carriers for call billing and maintenance. Although it may be possible for IXCs not to transmit ANI to the end user, the calling party should not have the ability to block the IXC receiving ANI for billing purposes. The Commission seeks comment on privacy considerations associated with ANI service subscribers. Given that ANI service subscribers are generally 800 service subscribers, 900 subscribers, or information service providers, it is necessary to analyze whether the privacy concerns are the same for calls placed in this commercial setting. While in some ways a caller's expectation of privacy may be reduced in a business settings, in other ways privacy concerns may increase as telephone numbers become widely disseminated beyond the business originally called, and are used as a means of telephonically intruding into a customer's home. Commenters should also address the issue of whether the privacy interests are affected by the fact that in a call to an 800 service subscriber, the called party is paying for the call. In addition, 800 service subscribers have traditionally received information on the telephone numbers associated with incoming calls for billing purposes. The call is in a sense a "collect call" and it is necessary to consider this element in weighing any privacy interest associated with 800 service. In the case of 900-service, the caller is indeed paying for the call in the sense that cost of the call to the caller is ultimately based on the cost of transmission plus a premium for whatever information service is offered. In calls placed to information service providers the calling party may be paying for transmission service separately from payment for the value of the information received. Calls to information services thus may be more similar to calls placed to 900 service than calls to 800 service numbers. The Commission asks whether there are privacy interests associated with the transmission of ANI to 800 and 900 service subscribers and/or information service providers, and, if so, what approaches should be considered to address the issue.

—End of FCC excerpts—

ANI technology and Caller ID technology now make it possible for the recipient of an incoming telephone call to analyze the incoming call and learn either the billing telephone number (through ANI) of the calling telephone station, or the telephone number of the calling telephone station (through Caller ID) by the use of automated equipment. This information may then be cross-referenced, again using automatic equipment, to a variety of computer data bases permitting the recipient of the incoming call to obtain and review information associated with the indicated telephone number from the incoming call. This information associated with the incoming identified telephone numbers may include the address, the individual name, the income, the occupation, the credit history, and the in-house business accounts history of the individual associated with the number.

This technology has also been used by businesses to assemble mailing lists of callers who have telephoned the business. For example, companies selling goods or services over the phone have used this technology to automatically develop mailing lists for their call-in telephone numbers. This permits them to do follow-up direct mail promotion with the same customer base, or to sell the mailing list to others interested in doing similar direct mail marketing.

This Caller ID and ANI technology works even for unlisted numbers. When this identification technology is applied to calls from unlisted numbers, it may, in effect, undermine the secrecy and confidentiality that owners of unidentified telephone numbers obviously wish to maintain.

Many states presently have the technical means installed to permit individual users to block Caller ID, either for all calls or for certain selected calls. It is also possible to reroute ANI through third party routing firms or to prevent display of one's calling/billing number through Caller ID or ANI scrambling devices.

Caller ID services and the use of ANI is proliferating throughout the communications industry. Local calls, long distance calls, 800 numbers, 900 numbers, 976 numbers and other pay-for-call numbers are all affected. There is considerable interest in expanding this technology and it is anticipated that ANI and Caller ID display devices and blocking option technologies will be installed throughout the telephone system in the near future.

There is a recurring problem as these blocking options become available. That is, the users of telephones are not generally aware of Caller ID and ANI opportunities and identification blocking options. Furthermore, it is at this time difficult for a telephone users that requests blocking of identification of their out-going calls to verify that such blocking is taking place. Even if Caller ID blocking methods are employed on a local level, the caller's originating number is still capable of being passed by Automatic Number Identification technology.

Hence, there is a current problem both in disseminating information as to options to block Caller ID and ANI from a telephone station, and there is also a perceived problem in the inability of the user requesting blocking to verify that the blocking has been put into effect. This problem already exists on a local Caller ID level in many states, and is still unrecognized on an interstate calling basis, for no blocking methods have been developed, thus far, for interstate Caller ID or ANI transmissions.

2. Description of Prior Art

Heretofore, Caller ID and ANI devices have been designed to provide the called party with as much information about the originating call as possible. They range from displaying the calling party's telephone number(s) on a telephone or attached device, to cross-referencing the incoming telephone number with extensive databases located on local personal computers or remote mainframe systems. Call routing services and dealer locator services utilize Caller ID and/or ANI techniques for routing calls to appropriate service centers, telemarketing representatives or associated vendors. Other ANI and Caller ID related devices have been developed in order to scramble the originating telephone number or re-route the transmission of the call through a third-party agency.

The following patents are cited as prior art:

| | | | |
|---|---|---|---|
| 5,077,788 | DEC 31, 1991 | Joseph Cook, Bill D. Lavoie | 379/142 |
| 5,070,525 | DEC 3, 1991 | Aleksander Szlam et al. | 379/196 |
| 5,058,152 | OCT 15, 1991 | Merrill Solomon et al. | 379/67 |
| 5,056,134 | OCT 8, 1991 | Thomas Bauer et. al. | 379/246 |
| 5,056,086 | OCT 8, 1991 | Michael Libonai | 379/88 |
| 5,048,075 | SEP 10, 1991 | Ronald A. Katz | 379/92 |
| 5,046,088 | SEP 3, 1991 | Edwin Margulies | 379/211 |
| 4,924,496 | MAY 8, 1990 | Romek Figa et. al. | 379/142 |
| 4,914,689 | APRIL 3, 1990 | Scott Grabinger et. al. | 379/142 |

None of the references cited above present verification to the caller of the effectiveness of any Automatic Number Identification (ANI) or Caller ID blocking or rerouting methods employed by the caller.

To the contrary, the references utilize the caller's information to display/utilize the information for the calling party's purpose: presenting the information to operators; displaying the caller's digits on the called party's telephone, computer or other display device; routing the call to appropriate telemarketing representatives, service agencies or local suppliers.

Cook automatically identifies the number of the calling station and uses it to seek calling station location. The call is then conferenced with an agency station associated with the services needed, and the location information is dispatched to the agency station.

Szlam's methods circumvent the blocking techniques a telephone customer may have activated on his/her line.

Solomon has developed a method for avoiding ANI identification. This invention relates to a system and method for maintaining anonymity of a person calling another even if the receiving party has a service which provides the originating telephone number to the receiving party.

Bauer provides an audible logo for identifying a common carrier, not the calling station number.

Libonati's switch provides an interactive mass announcement based custom call routing service.

Katz's telephonic-interface statistical analysis system assigns callers random designation that are stored along with statistical and identification data for reporting purposes.

Margulies' converter extracts caller's ANI information and uses the information to handle calls of a particular type or to handle calls from a particular class of calling parties, or provides the calling party's name, address, previous transaction history, etc. to the called party.

Figa's shows an automatic telephone incoming call number display system employing a directory for displaying the identity and telephone number of a calling party.

Grabinger shows methods and telecommunications systems for identifying the calling party to the called party in a telephone system Riskin defines a telephone system for connecting a customer to a nearby supplier of goods.

Other various forms of publicly accessible communication systems and applications utilizing ANI or Caller ID technology abound, for example:

U.S. Pat. No. 4,942,598 is a decoder which performs such operations as to selectively not respond, end, record or forward phone calls based on the calling party's originating number.

U.S. Pat. No. 4,914,689 is a another system designed to receive and display the calling party's telephone number.

U.S. Pat. No. 5,023,904 is a product ordering system.

U.S. Pat. No. 5,022,067 prevents unauthorized carrier access.

U.S. Pat. No. 5,003,595 prevents unauthorized computer access.

U.S. Pat. No. 5,014,298 organizes mail order data from callers.

U.S. Pat. No. 5,008,930 pulls information from a host database and transfers to second agent.

U.S. Pat. No. 5,001,710 enables telemarketers to retrieve caller desired information based on the calling or called number.

The present invention is unique in that it provides the caller with a means to verify if his/her calling number (or billing number) is being passed to the called party. The present invention also enables the caller to validate the efficacy of the blocking methods that were implemented at the time of the telephone call to prevent the transmission of his/her originating number to the called party.

SUMMARY OF THE INVENTION—OBJECTS AND ADVANTAGES

Accordingly, several objects and advantages of my invention are:

The present invention is an automated call interactive system which uses existing ANI equipment and techniques, existing Caller ID equipment and techniques, and existing Voice Response Units (VRU's) and techniques to provide a new and useful service to telephone users. The system and/or service can be supported by equipment installed at any incoming telephone station, by a service provider to the telephone information industry, or by local phone companies or long distance carriers.

Under the service, the party providing the system/service announces its availability and access number(s). A telephone user that desires to use the system calls the access number, which may be a local number, a long distance toll number, a 976 local pay-forecall number, a 900 long distance pay-for-call number, or an 800 toll free long distance number. When the user call comes in to the provider of this service, the present invention automatically uses Caller ID and/or ANI technology to identify the location, or the originating number or the billing number of the call.

When the call is made, the present invention uses automatic call interactive technology and audio response units (ARU's), or voice response units (VRU's), to inform the caller whether or not the identification technology can read his/her phone number.

If the phone number has not been blocked, the present invention will identify the originating or the billing number of the call and read it back to the caller. The present invention will then follow with an automated message providing other useful information about Caller ID and ANI such as the means available in the caller's location to block the Caller ID or ANI transmission(s) and/or refer the caller to the appropriate agencies.

If the present invention determines the Caller ID or ANI has been blocked (or is unreadable), then the present invention will automatically communicate this in an audio voice signal to the caller.

In this manner, a consolidated information source is provided and information is disseminated regarding how the identification blocking can be triggered, and a system is provided by which a caller can easily and cheaply verify that the requested blocking is in effect.

It is currently very difficult for a telephone user who requests Caller ID or ANI blocking to verify that the blocking is in effect. Local phone companies or long distance carriers do not currently offer this service to telephone subscribers. Special equipment is needed on the receiving end of an incoming telephone call to read identified numbers. Therefore, for any private user to confirm that his/her blocking methods are effective, the user must obtain Caller ID or ANI equipment, install it at another location, call the identification equipment and monitor the results. Practically speaking, this is not an option for most telephone users.

The present invention provides Caller ID and/or ANI verification and confirmation of blocking methods quickly and cheaply without a long-term investment by the calling party.

Further objects and advantages of my invention will become apparent from a consideration of the drawings and ensuing description of it.

BRIEF DESCRIPTION OF THE DRAWINGS

FIG. 3 is a block diagram depicting the hardware of a Calling Number Verification Service in greater detail

LIST OF REFERENCE NUMERALS

Figure 1:
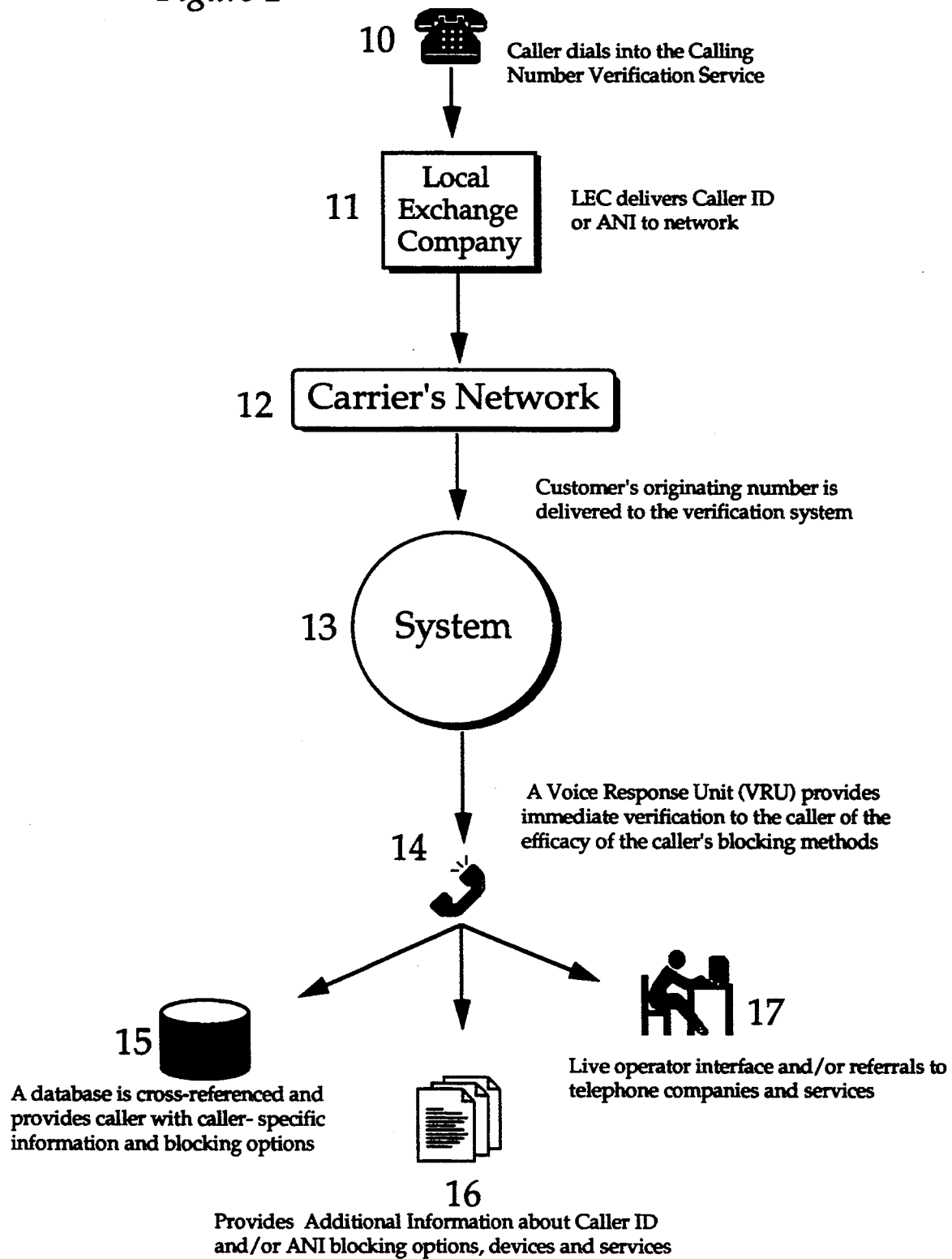
FIG. 1 is a flowchart presenting an overview of a Calling Number Verification Service.

10. Representation of an Originating Caller's Telephone System.
11. Representation of a Local Exchange Company's (Local Centraf Office) Services.
12. Representation of a Long Distance Carrier's Network.
13. Representation of equipment providing a Calling Number Verification Service.
14. Representation of a Voice Response Unit's Audible Verification of Caller's phone number (or blocking methods) being presented back to a customery.
15. Representation of database interactions which present voice prompts and information tailored to a customer's originating phone number and store caller specific information.
16. Representation of additional information about Caller ID and/or blocking options, devices or services stored in the system.
17. Depicts live operator interface and/or referrals to telephone companies and services.
20. Representation of a 900 Service Access.
21. Representation of an 800 Service Access.
22. Representation of a Request/Verification routine for an 800 caller's credit card.
23. Representation of a Greeting Message.
24. Representation of a test routine for ANI or Caller ID transmission, or blocking method.
25. Representation of an audible verification to a caller of his/her phone number, billing number and/or blocking methods.
26. Representation of a group of messages presented when the caller's phone number is unreadable.
27. Representation of a routine presenting informative text to a caller.
28. Representation of a list of menu options enabling a caller to select more information about Caller ID, ANI or related services and/or equipment.
29. Representation of Information, Services, Products or Referrals that is presented to a customer following a selection from a menu of options.
30. Representation of an exit and/or hangup routine from a Calling Number Verification Service.
31. Representation of a T1 Span.
32. Representation of a Channel Service Unit.
33. Representation of the prototype's computer system.
34. Representation of a Data Terminal Interface (DTI).
35. Representation of voice and call processing boards.
36. Representation of verification system's software programs.

DESCRIPTION OF THE INVENTION

As required, illustrative embodiments of the present invention are disclosed herein. However, physical communication systems, data formats, and operating structures in accordance with the present invention may be embodied in a wide variety of forms, some of which may be quite different from those of the disclosed embodiments. Consequently, the specific structural and functional details disclosed herein are merely representative; yet in that regard, they are deemed to afford the best embodiments for purposes of disclosure and to provide a basis for the claims herein which define the scope of the present invention.

The present invention is an automated call interactive system which uses existing ANI equipment and techniques, existing Caller ID equipment and techniques, and existing Voice Response Units (VRU's) and techniques to provide a new and useful service to telephone users. The system and/or service can be supported by equipment installed at any incoming telephone station, by a service provider to the telephone information industry, or by local phone companies or long distance carriers.

A Calling Number Verification Service can be implemented on a wide variety of computer hardware platforms utilizing various carriers and signalling protocols. The caller's ANI or Caller ID can currently be provided using either out-of-band (ISDN) signalling or traditional inband signaling from the long distance carrier or the local telephone company.

Out-of-band signaling uses a separate data link outside of the voice circuit to transmit call set-up and ANI information. In-band signaling transmits the signaling information for call set-up and ANI on the same circuit. In-band signaling provides three protocols—MF (Multi Frequency), DTMF (Dual Tone Multi Frequency) and Feature Group D emulation. (The current invention should not be limited by these protocols but should also encompass fiber optics, microwave, satellite etc. transmissions which provide the caller's location/calling number or billing number to the verification system.)

The current invention can obtain the ANI or Caller ID utilizing any one of these protocols in an analog or digital format. The hardware supporting the display and/or voice verification can range from intelligent phone systems and low-end personal computer to mini and mainframe computer systems.

Voice verification can be provided via a channel bank, voice response units (VRU) or other automated voice-response system(s), or the information can be presented to/by live operators for Caller ID or ANI verification, customer education and/or enhanced service and assistance.

Although the present invention can be created on a wide variety of computer hardware platforms, a working model, or prototype, of the system has been developed in order to evaluate its commercial potential and to document its building and testing. Because of the universality of telephone systems and the highly controversial nature of the associated privacy issues, the present invention's commercial success seems eminent and the release of this service to all telephone users promises very rapid acceptance and recognition.

The prototype, though a fully functional model, does not incorporate the most expensive equipment, or elaborate hardware and software. The following embodiments illustrated and discussed herein are intended to teach those skilled in the art the most expedient method known by the inventor to make and use the invention. Nothing in the specification should be considered as limiting the scope of the present invention. Any changes could be made by those skilled in the art to produce equivalent methods and systems without departing from the invention.

DETAILED DESCRIPTION OF THE DRAWINGS

FIG. 1 is a flowchart of a method for implementing a Calling Number Verification Service.

The caller dials into the Calling Number Verification Service from a conventional telephone station 10. The station 10 can be an office phone, an individual's home phone, a telephone in a hotel, a pay phone, a cellular phone, etc.. This telephone station passes the Caller ID or ANI digits to the system 13 via a local exchange company and/or long distance carrier 12. The call can be made from any telephone station 10 capable of transmitting information digits to the system 13.

The Calling Number Verification Service can, once again, be implemented on a wide variety of computer hardware systems 13 utilizing various carriers and network signalling 12 protocols. The system 13 can be Customer Premises Equipment (CPE), or can be located at a service bureau, a telephone company's network switches, etc..

The present prototype system 13 utilizes a 486-33MHZ Personal Computer System with 200MB Hard Drive, 16MB of Ram, running OS/2 for multiple processing of the software programs 36. The multi-line Voice Communications System consists of all the necessary hardware and software modules to connect a T1 31 dedicated access line to a PC and perform all required voice processing functions.

The hardware equipment of the verification system 13, consists of a channel service unit (CSU) 32, data terminal interface (DTI) 34 and voice and call processing boards 35 which interface the T1 31 span (currently using standard DTMF protocol) with the personal computer system 33 and software 36. Again, a wide variety of channel service units 32, data terminal interfaces 34 and voice and call processing boards 35 are readily available to the public. The following specifications further depict the characteristics of the particular prototype's configuration.:

System 13 Additional Specifications:
Service Type: T-1 D4 format (B8ZS is also supported)
Signalling: Four wire terminated #&M (robbed bit)
Start: Wink Start
Dial Tone: Enabled (standard frequency)
Digits: DTMF (Dual tone multi frequency)
Interface Code: 04DU9-B
Service Code: 6.OP
Channels: 24
Ringer Equivalence: 0.0A
Outdial Senderized: Yes
FCC Registration: EMCUSA-65242-XD-N
USOC Jack: RJ48C or RJ48X
DTMF Characteristics:

The present invention's signalling from the carrier's network 12 is Dual Tone Multi Frequency (DTMF) type. The DTMF provides for 16 unique signals. Each signal is composed of two voice band frequencies, one from each of two mutually exclusive frequency groups consisting of four frequencies each, utilizing the following signalling codes:

| Low Group | High-Group Frequencies (Hz) | | | |
|---|---|---|---|---|
| | 1209 | 1336 | 1477 | 1633 |
| 697 | 1 | 2 | 3 | Not Used |
| 770 | 4 | 5 | 6 | Not Used |
| 852 | 7 | 8 | 9 | Not Used |
| 941 | * | 0 | # | Not Used |

The Long Distance Carrier's (IXC's) terminating network 12 seizes a trunk at the system 13.

The current prototype responds to the trunk seizure with a wink start signal when ready to receive pulsing.

On receipt of the wink start signal from the system 12, the IXC switch outpulses the ten digit ANI.

If ANI is not transmitted the IXC switch outpulses a series of digits (e.g. area code+555-5555).

BASIC LOGIC FLOW

The menu structure and corresponding information, in large part, depends on the capabilities of the computer system, the network and/or the service bureau providing the service (especially in the area of "error" messages when attempting to read the caller's ANI).

Figure 2:
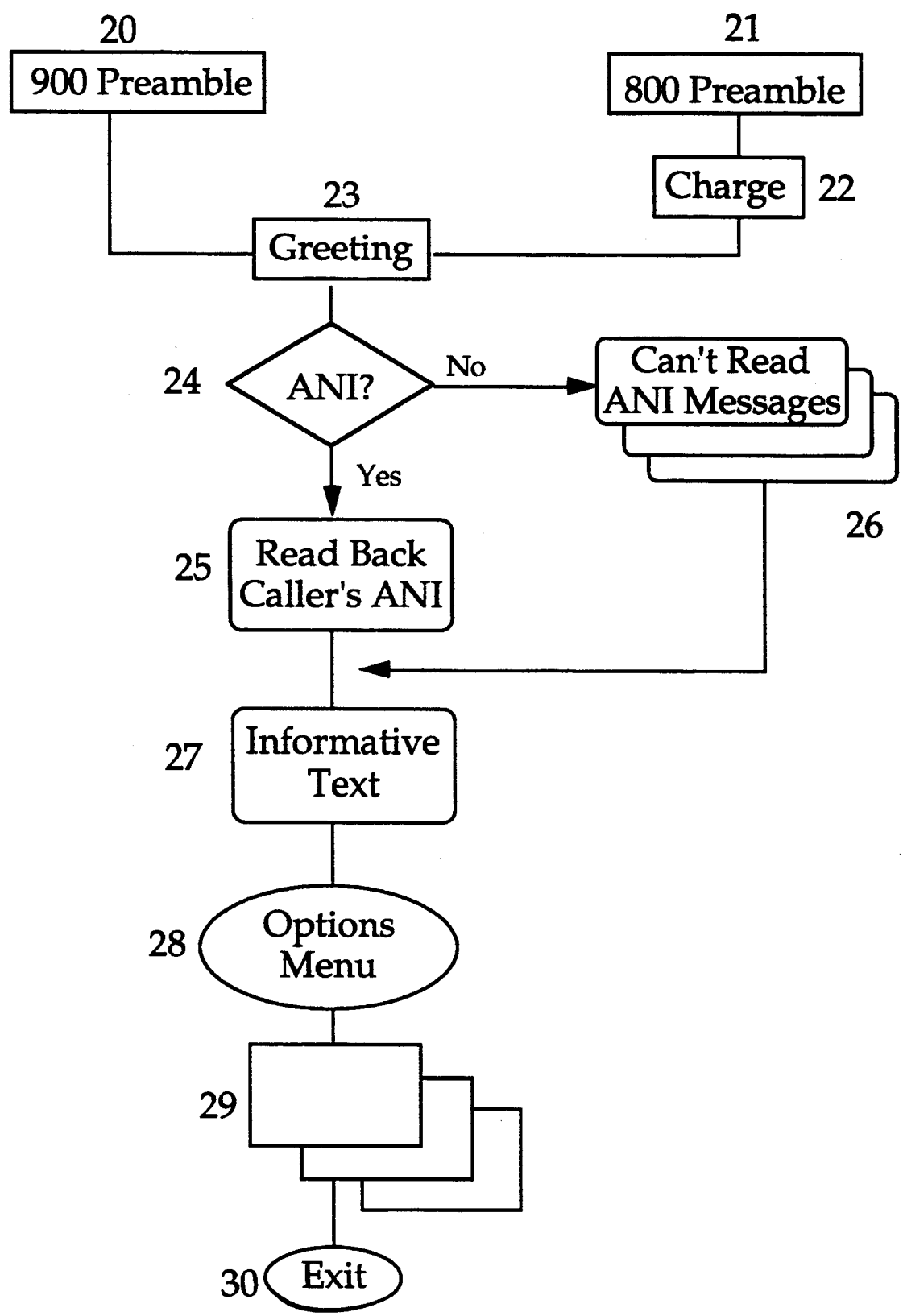
FIG. 2 is a high level program flowchart further illustrating the system architecture of a Calling Number Verification Service.

The logic flow of the present invention is outlined in FIG. 1 and shown in greater detail in FIG. 2:

The system software analyzes the digits received from the caller and presents the caller with the appropriate messages 14, FIG. 1.

Databases 15 is maintained logging every customer's call, capturing such information as the caller's ANI, time the call was pfaced, time the call terminated etc. and the additional information that was requested by the caller.

The customer's ANI is also cross-referenced with additional databases that provide custom prompts and caller-specific information 16, or allow for live operator interface and/or referrals to telephone companies and services 17.

The Caller receives the audio preamble for 900 calls 20, FIG. 2, or for 800 calls 21. If the system detects an 800 call, a routine for charging the customer's credit card is activated 22.

In either case, the customer is presented with a greeting 23.

If the Caller's ANI is known at 24, it is read back to the Caller at 25 by the VRU.

If the Caller' ANI is not known at 24, an appropriate message is delivered at 26 (e.g. "Your call is effectively blocked, out-of-area, rerouted . . . ") In either case, the Caller is then presented with the information text at 27 by the VRU.

The Caller is then presented with an automated menu of options at 28 which he/she can return to at any time.

Various text is presented to the caller 29, depending on which menu item was selected.

An exit routine 30 captures caller statistics at the termination of the call.

SAMPLE CODING

A Calling Number Verification Service can be implemented on a wide variety of computer hardware platforms utilizing various carriers and signalling protocols. The associated operating systems, coding and programming techniques used to implement such a service can vary greatly. Different coding techniques would obviously be required of different systems.

This following sample code is presented only to provide those skilled in the art with an example of some basic routines required to provide the capture and verification of a caller's identifying information. The sample code is not a complete program of a Calling Number Verification Service.

The sample code is written in NATURAL MICROSYSTEMS' high-level programming language called VSCRIPT and was utilized in the first prototype of the Calling Number Verification Service.

```
;INITIAL DEFINITIONS
;Define external functions
;External functions for using the Trunk Manager
    DEFINE_FUNC
    ("TrunkINIT", "vstrunk", "TRUNKINIT")
    DEFINE_FUNC
    ("TrunkCallWait", "vstrunk", "TRUNKCALLWAIT", "*c")
    DEFINE_FUNC
    ("TrunkTONE", "vstrunk", "TRUNKTONE", "i")
    DEFINE_FUNC
    ("TrunkANSWER", "vstrunk", "TRUNKANSWER", "i", "*i")
    DEFINE_FUNC
    ("TrunkHANGUP", "vstrunk", "TRUNKHANGUP")
    DEFINE_FUNC
    ("TrunkCallerGone", "vstrunk", "TRUNKCALLERGONE")
    DEFINE_FUNC
    ("ReIndex", "dbutil", "REINDEX", "*c", "*c")
;Define Local variables
    r = 0                   ;return value from external functions,
                            :0 = success, not-zero = failure
    hangup_flag = 0         ;flag returned from some
                            external functions
```

-continued

```
    num_digits = 13     ;(constant) Number of digits expected
    xtra = 0            :place holder for unexpected digit
    clear (error)       ;error string
    clear (digits)      ;string of digits received
;Declare event trap for hangup event
    ON (LPCUROFF) GOTO !remotehangup
;Declare event trap for "exit" key. Note that Vscript will only
;recognize events while a call is answered. At all other times
;events are handled by the external functions.
;The TRUNK . . . functions will return (with return value of −1)
;when they see an 'F3' keyboard event.
;This is currently not changeable.
    PRINT (" F3 Exits Program")
    ON (F3) GOTO   !exit
;Perform initialization necessary to speak numbers
    r = LOADPROMPT("AMERICAN")    ;Set up to say
                                   prompts in
                                   American English
    r < 0? error = "loadprompt" GOTO !abend
```

```
;DEFINE TRUNK PARAMETERS
    PRINT (" Setting trunk parameters")
;       DID SPECIFIC PARAMETERS
;Note: If any DID parameters are to be changed from their
;defaults, this must be done before calling TRUNKINIT.
;In this example, parameters are set by the program. The same
;result could be obtained by adding the settings to VS.PRO,
;ME2.PRO, or to a user profile that is loaded with LOADPRO.
;Set the name of the Trunk Control Overlay and associated
;parameter category and verify that the 'trunk' parameter
;category is defined
    trunk.overlay = "TCPDID"
    trunk.overlay = "TCPDID" ? error =
    "Missing TRUNK.PRM" GOTO !abend
    trunk.signal_type = BOARD_TYPE
;Modify some of the default settings.
;Change default tone to Reorder (the default value is Reorder).
;This tone is played by the trunk control program if there is no
;response from the PC to an incoming call. Change the timout to 5
;seconds (default is 10).
    tcpdid.default_tone = 3           ;1 = ring
                                      ;2 = busy
                                      ;3 = reorder
    tcpdid.pc_timeout = 1000          ;10 instead of 5 1/100
                                      seconds
    tcpdid.num_digits = num_digits    ;expected number of
                                      digits
    ME2_CHANNEL.TT_1ST_WAIT =         ;Wait for 1st TT in
    250
                                      1/100 seconds
;Permanently assign a line to this script.
;In order to ensure that no calls are lost, VBX line arbitration is
;not used once a port is initially obtained. The TrunkInit
;function gets a free port from the group 'vs.groupnumber', then
;downloads the Trunk Control Program.
;The Trunk Control Program is active until a call is answered,
;then is reactivated when the call is finished.
    r = TrunkINIT( )
    r = 0? error = "TrunkInit" GOTO !abend
    PRINT (" Trunk Initialization successful")
```

```
;WAIT FOR INCOMING CALL & ANI DIGITS
!top
    msg = "Waiting for call-"
    msg &= tcpdid.num_digits
    msg &= "digits."
    PRINT (msg)
    r = TrunkCallWait(digits)
    γ = 0? error = "TrunkCallWait" GOTO !abend
    PRINT (" Incoming call received")
;Start call statistics.
DO !STATSBEGIN
    ;The detected digits are in the Digit variable
    ;Separate into areacode, prefix & numbers and put into database
        Stats.Inbound = SubStr (digits, 1, 3)    ;TEMP for 800/900
        Stats.Areacode = SubStr (digits, 4, 3)
        Stats.Prefix = SubStr (digits, 7, 3)
        Stats.Number = SubStr (digits, 10, 4)
        SevenDigits = Substr (digits, 4, 7)
        NineDigits = Substr (digits, 4, 9)
        TenDigits = Substr (digits, 4, 10)
    ;This subroutine adds state abbreviation and state number for call
```

```
-continued
statistics.
    OpenDB ("Areacode", "Areacode")
    OpenDB ("States", "Abbrev")
    Areavar = "XX"        ;Set these two for unknown areacodes
    Digitvar = "0000"
    FindRec (Stats.Areacode, "Areacode") ? Areavar =
    Areacode.State
    Stats.State = Areavar
    FindRec (Stats.State, "States") ? Digitvar = States.Digits
    Stats.StateNum = Digitvar
    CloseDB ("Areacode")
    CloseDB ("States")
    Close DB ("MenuHist")
;Make them pretty for vendor lists in MenuHist.DBF
    nicedigits = "("
    nicedigits &= Stats.Areacode
    nicedigits &= ")"
    nicedigits &= Stats.Prefix
    nicedigits &= "-"
    nicedigits &= Stats.Number
RETURN
!HearANI
;Subroutine that plays back the callers' ANI
;Prefixing '@' to the digit string causes the prompt manager
;to speak each individual digit
    PlayMsg ("Utility", 1)    ;I have identified your # as ...
    prompt_text = "@" & nicedigits    ;Done this way for
                                      pauses in between digits
;Utilize Prompt Manager to speak the digits back to the customer
    r = SayPrompt (prompt_text)
    r = 0 ? error = "SayPrompt" GOTO !abend
RETURN
```

SAMPLE SCRIPTS

The voice text or scripts of the present invention are very didactic and are constantly being modified to enhance the information service. Currently the present prototype provides the service in the English language, but the hardware and technology to present the Caller ID and ANI verification in various languages is readily available and planned for incorporation.

The preamble 20 or 21, and greeting 23 are gively to each Caller by a VRU. A sample preamble 20 for 900 callers may say:

"Thank you for calling Project Designed System's 1-900-xxx-xxxx"
"The purpose of this information service is to provide you with a means of determining if your telephone number is currently being passed to the party you are calling."
"It will also provide you with more information about automatic number identification, how you may subscribe for services for your home or business, or how you can obtain more information about blocking your phone number from being transmitted when you make a call."
"The cost of this call is $2 for the first minute and $1 for each minute thereafter. The average length of the call is 3 minutes.
"If you are under the age of 18, please obtain your parents' permission before utilizing this service."
"If you do not wish to be charged, hang up now."

Callers can have access to this system via an 800 number or other not pay-for-call numbers. This will enable them to call from third party and public business telephone systems, hotels, motels, pay phones, car phones or phones outside an equal access area. When access is not on a pay-for-call line, the Caller is charged 22 with a credit card verification and debit routine. (The service could also be offered free of charge to telephone customers through government or telephone company subsidized programs.)

When used by automated call-interactive equipment, Callers can enter their credit card numbers and expiration dates using the key pads of the touchtone telephones and charge the call to an approved credit card 22.

If the Caller's identifying information has not been blocked at 24, the present invention then at 25 reads an appropriate message to the Caller such as:

"I have already identified the phone number you are currently calling from as (xxx) xxx-xxxx."

If the Caller's number cannot be identified at 24, then the reason is determined and the appropriate message 26 given indicating the same. Reasons given for non-identification may include: activation of *67 per call blocking, activation of per-line blocking, call origination from a non-equal access area, origination at a new or unregistered telephone, or the originating call has been re-routed through a third party service firm.

(An out-of-area call is a call originating from a LEC's (Local Exchange Company) area that is not tied in to the IXC's (long distance carrier) network. Calls originating from an LEC's that do interface with a particular long distance carrier's network are considered to be from an equal access area and will provide the ANI or Caller ID information. Third party routing devices or scrambling services provide anonymity when placing calls, preventing the caller's number from appearing on phone bills or Caller ID or ANI display devices.)

Afterwards an informative text is given to the Caller at 27, such as:

"If the party you are calling has the capability to display your phone number, your number is available to them before they answer the phone. The party you are calling could cross-reference your phone number with a database containing such information as your name, address and any other pertinent information they may have."
"This information could assist them in deciding if they want to take your call, they could route it to an appropriate operator for enhanced customer service, or your name could be used for immediate telemarketing or mailing campaigns."
"This capability is already currently available to many private parties, businesses where Caller ID is available and to 800 and 900 services throughout the United States, ... "

Following the informative text 27, the options menu 28 is presented, enabling the caller to choose from a list of options.

The desired information is then provided to the caller via audio text by the VRU, a hard-copy follow-up, or a referral (locator service) to associated participants such as participating vendors, local telephone companies and/or public utilities commissions.

By selecting one of the options 29, the caller can also consent to receive faxes, mailed catalogues, solicitations or a telephone follow-up from other sources of information.

After the Caller has consented to being placed on a mailing list he/she can receive more information about home and business equipment, software, or services from associated vendors. After selecting this option from the menu, the Caller can be referred to (or automatically routed to) affiliated product providers. These products may include phones that display the Caller ID, attachments that display Caller ID, and/or ANI or Caller ID blocking devices.

Opinion polls, surveys, promotions and caller statistics can be implemented and used to provide further information to the caller or to news agencies. This aspect of the service allows for follow-up stories and "progress reports" for additional press releases or news briefs.

Referrals, transfers, or automatic letter-generation to the Caller's Public Utilities Commission, a consumer advocate group, a participating vendor, or a government official championing a particular position will be implemented as the opportunities warrant.

Initially, three options 29, targeting home use, business use and more information on call blocking, are provided. They generate prompts, respectively, such as:

"If you would like additional information about how you can obtain this capability for your home, press 1."

"If you would like additional information about how you can utilize this capability for your business, press 2."

"To obtain more information about how you can prevent your phone number -from being displayed whenever you place a call, press 3."

The present invention can generate general or caller-specific information depending on the Caller's area code or phone number. For example:

"Contact your local telephone company to ascertain which type of call blocking is available to you."

"No call blocking is available in your area Contact your local phone company, your stat@s Public Utilities Commission, or your state senator and voice your concerns."

"Per line blocking is available in your a a (which means your telephone will never pass your number). Request the service from your phone company and call this number again to verify it is functioning."

"Per call blocking is available in your area. This means your telephone will not pass your number when you first dial a sequence of predefined digits. Request the service from your phone company and call this number again, utilizing the special sequence, to verify it is working properly."

The software and associated scripts required to develop a Calling Number Verification Service can vary greatly. Computer programs can be written in a variety of languages, on various machines. Voice files can be recorded, stored, and presented in a myriad of ways.

SUMMARY, RAMIFICATIONS, AND SCOPE

The present invention is an automated call interactive system which uses existing ANI equipment and techniques, existing Caller ID equipment and techniques, and existing Voice Response Units (VRU's) and techniques to provide a new and useful service to telephone users. The system and/or service can be supported by equipment installed at any incoming telephone station, by a service provider to the telephone information industry, or by local phone companies or long distance carriers.

Heretofore, Caller ID and ANI devices have been designed to provide the called party with as much information about the originating call as possible. They range from displaying the calling party's telephone number(s) on a telephone or attached device, to cross-referencing the incoming telephone number with extensive databases located on local personal computers or remote mainframe systems. Call routing services and dealer locator services utilize Caller ID and/or ANI techniques for routing calls to appropriate service centers, telemarketing representatives or associated vendors.

The present invention is unique in that it provides the caller with a means to verify if his/her calling number (or billing number) is being passed to the called party. The present invention also enables the caller to validate the efficacy of the blocking methods that were implemented at the time of the telephone call to prevent the transmission of his/her originating number to the called party.

When the incoming call is made, the present invention reads the number the caller is calling from, or the billing number, back to the caller. This confirmation is currently unavailable to consumers unless they know someone with caller identification equipment or services.

The present invention also enables the caller to verify that his/her call blocking procedures (e.g. through utilization of FCC or carrier-determined blocking digits such as *67, line blocking, or third party routing devices or privacy firms) are effectively preventing their phone number from being identified.

Callers utilizing call blocking procedures for Caller ID will also be informed about how their current local service(s) relate to interstate Caller ID and/or long distance, 800 and 900 ANI transmission.

The present invention then gives the caller additional information about caller identification services, such as how he/she may utilize the emerging ANI technology's related equipment, computer software, or communication services to benefit from ANI in a home or business environment.

In addition, the invention refers the customer to local telephone companies, public utility commissions, consumer groups or government entities for additional information on call or line blocking.

The embodiments illustrated and discussed herein are intended only to teach those skilled in the art the best way known by the inventor to make and use the invention. Nothing in the specification should be considered as limiting the scope of the present invention, but rather as an exemplification of one preferred embodiment thereof. Many other variations are possible. Any changes could be made by those skilled in the art to produce equivalent methods and systems without departing from the invention. The scope of the invention should be determined not by the embodiment(s) illustrated, but by the appended claims and their legal equivalents.

I claim:

1. A method of processing a telecommunications transmission from a calling party to a terminating call processing system and providing said calling party with verification of said calling party's originating telephone number comprising the steps of:

detecting at a first premise, remote from said system, an off-hook condition of said system's telephone line;

automatically sending from said first premise a request-to-send signal in response to detecting the said system's off-hook condition;

transmitting said calling party's originating telephone number from said first premise to said system;

receiving said originating telephone number;

translating said originating telephone number into an audible format;

connecting said calling party to a source of audible presentation of said audible format.

2. A method of processing a telecommunications transmission from a calling party to a terminating call processing system and providing said calling party with verification of said calling party's billing telephone number comprising the steps of:

detecting at a first premise, remote from said system, an off-hook condition of said system's telephone line;

automatically sending from said first premise a request-to-send signal in response to detecting the said system's off-hook condition;

transmitting said calling party's billing telephone number from said first premise to said system;

receiving said billing telephone number;

translating said billing telephone number into an audible format;

connecting said calling party to a source of audible presentation of said audible format.

3. A method of processing a telecommunications transmission from a calling party to a terminating call processing system and providing said calling party with verification of said calling party's blocking signal comprising the steps of:

detecting at a first premise, remote from said system, an off-hook condition of said system's telephone line;

automatically sending from said first premise a request-to-send signal in response to detecting the said system's off-hook condition;

transmitting said calling party's blocking signal from said first premise to said system;

receiving said blocking signal;

translating said blocking signal into an audible format;

connecting said calling party to a source of audible presentation of said audible format.

4. A method of processing a telecommunications transmission from a calling party to a terminating call processing system and providing said calling party with verification of said calling party's originating location comprising the steps of:

detecting at a first premise, remote from said system, an off-hook condition of said system's telephone line;

automatically sending from said first premise a request-to-send signal in response to detecting the said system's off-hook condition;

transmitting said calling party's originating location from said first premise to said system;

receiving said originating location;

translating said originating location into an audible format;

connecting said calling party to a source of audible presentation of said audible format.

* * * * *